Dec. 9, 1952  E. VUIGLIO  2,621,082
ADJUSTABLE CRAMP FOR VEHICLE WHEELS
Filed April 24, 1947
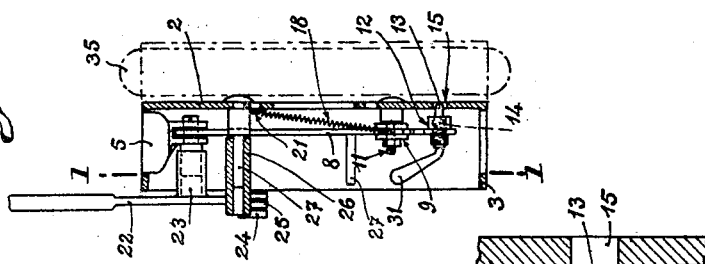
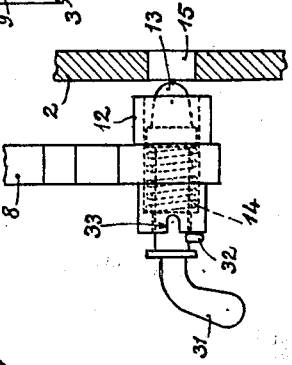
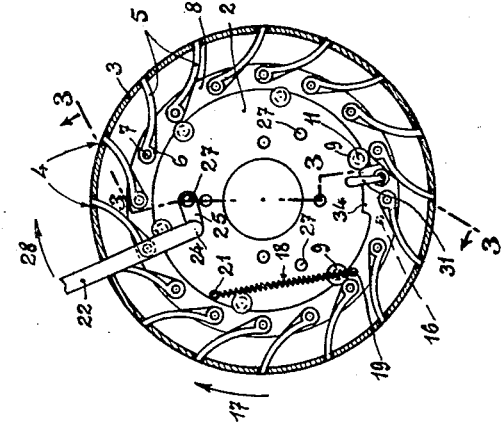
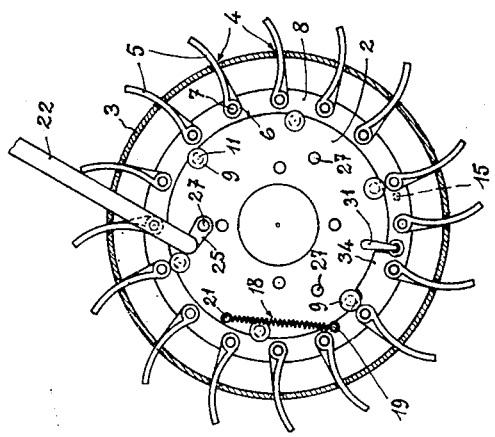
Inventor
ERNEST VUIGLIO
BY Haseltine, Lake + Co.
AGENTS Patented Dec. 9, 1952

2,621,082

UNITED STATES PATENT OFFICE 2,621,082

ADJUSTABLE CRAMP FOR VEHICLE WHEELS

Ernest Vuiglio, Lorette, France

Application April 24, 1947, Serial No. 743,484
In France April 26, 1946

7 Claims. (Cl. 301—47)

1

My invention has for its object an improved wheel for tractors and power agricultural implements the adhering cramps of which are adjustable or adapted to recede through a simple and speedy operation without requiring any dismantling and without this leading to a complicated and intricate construction.

According to my invention, the adherent cramps projecting through openings provided in the wheel rim are pivotally secured to a circle or annular member carried inside said wheel through its lateral flange and adapted to assume with reference to said flange a certain angular displacement that produces the retraction of the cramps of their projection.

My invention covers also further objects such as follows:

A hand controlled bolt is provided between the circle and the flange of the wheel so as to allow after a change of angular position a bolting of one of these members with reference to the other in their new position.

The circle is carried inside the wheel by supporting rollers mounted on its lateral flange and over which it rolls when it changes position.

The projection of the cramps is produced by a removable hand operated lever that is provided with a socket fitted over a point of the circle such as the pivoting end of any of the cramps so as to swivel round same and said lever bears on the other hand on a corresponding point of the flange such as a smooth stud thereon whereby its rocking provides for an angular shifting of the circle with reference to the flange.

This projection of the cramps is initiated and furthered by a spring the ends of which are connected respectively with the flange of the wheel and with the circle and the traction exerted by said spring on the circle urges the latter into rotation as soon as it is released.

I have shown in the accompanying drawings by way of example and in diagrammatic showing a preferred form of execution of my improved wheel. In said drawings:

Figs. 1 and 2 are front views of said wheel seen through its outer face with the cramps respectively in their receded and projecting positions.

Fig. 3 is a cross-section through line 3—3 of Fig. 1.

Fig. 4 shows at an increased scale a detail view of the locking system.

As apparent from the drawings the wheel includes a flange 2 the rim or tread 3 of which includes ports 4 uniformly distributed over its periphery and through which may pass ground-engaging cramps including each a blade 5 ending

2 at its inner end with an eye 6 pivotally secured over a trunnion or stud 7 carried by a circle or annulus 8.

Said circle 8 is carried by rollers 9 bearing against its inner periphery and that are rotatably mounted on axes 11 riveted or welded to the flange 2 of the wheel so as to stand perpendicularly thereto.

This circle carries moreover the casing 12 of a bolt 13 urged by a spring 14 and adapted to engage selectively one of the openings or staples 15 and 16 provided in the flange 2.

The circle is urged into rotation in the direction of the arrow 17 by a spring 18 secured thereto at 19 and at its other end at 21 to a stationary point of said flange 2.

Lastly in order to provide for the projection of the cramps said wheel is associated with a removable tool constituted by a lever 22 including a socket 23 projecting laterally with reference thereto while its inner end 24 carries a rod 25 carrying a further socket 26 serving as a crank when it caps the head of one of the smooth studs 27 carried by the flange 2.

The operation of the cramps is easy to understand. As a matter of fact, when they are in position for travelling on road, the cramps recede inside the wheel and, if it is desired to operatively extend the cramps, the bolt 13 is first released. The socket 23 of the lever 22 is then set over the stud 7 serving as a pivot for the eye 6 of any of the cramps 5 and simultaneously the socket 26 is set on the nearest pin 27 carried by the flange 2. The lever 22 is then turned in the direction of the arrow 28 whereby the lever attracts the trunnion 7 towards the eye 6 and causes the circle 8 to rotate in the direction of the arrow 17 so as to provide for the simultaneous projection of all the cramps, said projection being previously initiated through the action of the spring 18 that urges the circle 8 into rotation.

It should be mentioned that the projection of the cramps is also furthered by the resistance of the ground acting on the cramps, the wheel rotating in the same direction of the arrow 17.

Once the cramps have projected, the bolt 13 lies in front of the staple 15 and engages same so as to bolt the circle 8 in the position now assumed thereby.

Intermediary openings may be provided if desired between the extreme openings 15 and 16 so as to adjust the amount of projection of the cramps in accordance with the hardness of the ground.

The handle 31 of the bolt 13 is provided (Fig.

4) with a tenon 32 engaging a groove 33 in the bolt casing 12. When drawing said handle outwardly, the tenon is brought out of the casing groove and as the handle is being rotated, the tenon holds the bolt away from the corresponding opening or staple, which makes the control of the circle 8 through the lever 2 easier.

To limit the projection and the receding movement of the cramps 5, the circle 8 is provided with a boss 34 adapted to bear against the sides of the adjacent roller 9.

The wheel just described is mounted side by side with the normal tire wheel 35 (Fig. 3) to which it is secured through threaded studs and nuts. It shows therefore important advantages when compared with wheels provided with permanently projecting adhering cramps. It allows as a matter of fact the tractors or power agricultural machines to move on roads under good conditions while allowing them to be always ready for field work. It avoids the shocks produced when moving over road or over hard ground with wheels permanently provided with adhering cramps that submit the material to a serious trial whereas my invention requires no change in wheel or mounting of bands or tires, which operation always leads to a substantial loss of time.

The adhering cramps of my improved wheel are moreover easily dismountable which allows after wear reshaping them through autogenous or electric welding.

Such wheels may also form twin systems with pneumatic wheels in order to increase adherence.

Lastly, it is obvious as apparent from the above that my invention is by no means limited to the sole form of execution disclosed hereinabove; it covers on the contrary all the possible modifications thereof falling within the scope of the accompanying claims.

What I claim is:

1. A wheel for tractors or agricultural machines adapted to move over any ground including a rim provided with a plurality of equally distributed openings, an annular member coaxial with the rim, a series of cramps adapted to pass through the different rim openings, a flange rigid with the rim and coaxial therewith and rotatably carrying the annular member, means for bolting temporarily the annular member in at least one predetermined angular position with reference to the flange, a first series of studs rigid with the annular member for carrying pivotally the inner ends of the cramps, a second series of studs rigid with the flange and of a less number than the studs of the first series and arranged in the vicinity thereof, so constructed and arranged that action between any stud of the first series of studs and an adjacent stud of the second series of studs is adapted to modify their angular spacing and thereby the angular setting of the different cramps.

2. A wheel for tractors or agricultural machines adapted to move over any ground including a rim provided with a plurality of equally distributed openings, an annular member coaxial with the rim, a series of cramps adapted to pass through the different rim openings, a flange rigid with the rim and coaxial therewith and rotatably carrying the annular member, means for bolting temporarily the annular member in at least one predetermined angular position with reference to the flange, a series of studs rigid with the annular member for carrying pivotally the inner ends of the cramps, a spring urging the annular member into rotation with reference to the flange, means for limiting the angular movement of the annular member in either direction, action on two corresponding points of the annular member and flange respectively being adapted to angularly shift said annular member and flange with reference to each other.

3. In a wheel for tractors and agricultural machines adapted to move over any ground, the provision of a rim provided with a plurality of openings, an annular member coaxial with the rim and adapted to move round the axis of the latter, a lateral flange rigid with the rim, rollers carrying the annular member on the inside thereof, pivots carried by the flange for rotatably carrying said rollers, a series of cramps adapted to pass through the different rim openings, means for pivotally securing the inner end of the cramps to equally distributed points of the annular member, control means for angularly shifting the annular member round its axis with reference to the flange and thereby moving the cramps gradually between their receded and projecting positions with reference to the corresponding openings in the rim, at least one projection on the annular member the path of which passes between the rollers, said rollers acting as angular stops for the projection of the annular member.

4. In a wheel for tractors and agricultural machines adapted to move over any ground, the combination of a rim, provided with a plurality of openings, an annular member coaxial with the rim, a lateral flange rigid with the rim and rotatably carrying the annular member, a series of cramps adapted to pass through the different rim openings, a first series of studs rigid with the annular member for carrying pivotally the inner ends of the cramps, means for bolting the annular member in at least one predetermined angular position with reference to the flange, a second series of studs rigid with the flange and of a less number than the studs of the first series and arranged in the vicinity thereof, so that action between any stud of the first series and an adjacent stud of the second series provides an angular shifting of the annular member and flange with reference to one another, and a spring connecting two angularly shifted points of the flange and annular member respectively for urging the annular member into the relative angular position corresponding to the projection of the cramps beyond the rim openings.

5. In a wheel for tractors and agricultural machines adapted to move over any ground, the provision of a rim provided with a plurality of openings, an annular member coaxial with the rim and adapted to move round the axis of the latter, a lateral flange rigid with the rim, rollers carrying the annular member on the inside thereof, pivots carried by the flange for rotatably carrying said rollers, a series of cramps adapted to pass through the different rim openings, means for pivotally securing the inner ends of the cramps to equally distributed points of the annular member with reference to the flange, means for shifting angularly the annular member to move the cramps gradually between the receded and projecting positions with reference to the corresponding openings in the rim, at least one projection on the annular member the path of which passes between the rollers, said rollers acting as angular stops for the projection on the annular member, at least one bolt adapted to lock the annular member in a predetermined angular position with reference to the flange and a spring connecting the annular member with the flange through angularly shifted points thereof and adapted to urge the annular member into an angular position corresponding to the projection of the cramps beyond the rim openings.

6. In a wheel for tractors and agricultural machines adapted to move over any ground, the provision of a rim provided with a plurality of openings, an annular member coaxial with the rim, a lateral flange rigid with the rim and rotatably carrying the annular member, a series of cramps adapted to pass through the different rim openings, means for pivotally securing the inner ends of the cramps to equally distributed points of the angular member, control means for angularly shifting the annular member with reference to the flange to move the cramps gradually between their receded and projecting positions with reference to the corresponding openings in the rim, at least one bolt adapted to lock the annular member in a predetermined angular position with reference to the flange and a spring connecting two points on the annular member and on the flange respectively for urging the annular member into an angular position corresponding to the projection of the cramps beyond the rim openings.

7. A wheel for tractors or agricultural machines adapted to move over any ground including a rim provided with a plurality of equally distributed openings, an annular member coaxial with the rim, a series of cramps pivotally secured to the annular member and adapted to pass through the different rim openings, a flange rigid with the rim and coaxial therewith and rotatably carrying the annular member, means for bolting temporarily the annular member in at least one predetermined angular position with reference to the flange and means projecting laterally with reference to the annular member, action on which provides for the relative angular shifting of the pivotal points of the cramps with reference to the openings in the rim.

ERNEST VUIGLIO.

REFERENCES CITED

The following references are of record in the file of this patent:

UNITED STATES PATENTS

| Number | Name | Date |
|---|---|---|
| 1,813,391 | Ellsworth | July 7, 1931 |
| 2,229,830 | White | Jan. 28, 1941 |

FOREIGN PATENTS

| Number | Country | Date |
|---|---|---|
| 108,155 | Australia | 1939 |
| 451,378 | Great Britain | 1936 |